W. ADAMSON.
TREATING SUBSTANCES WITH LIQUID HYDROCARBON.
No. 183,098. Patented Oct. 10, 1876.
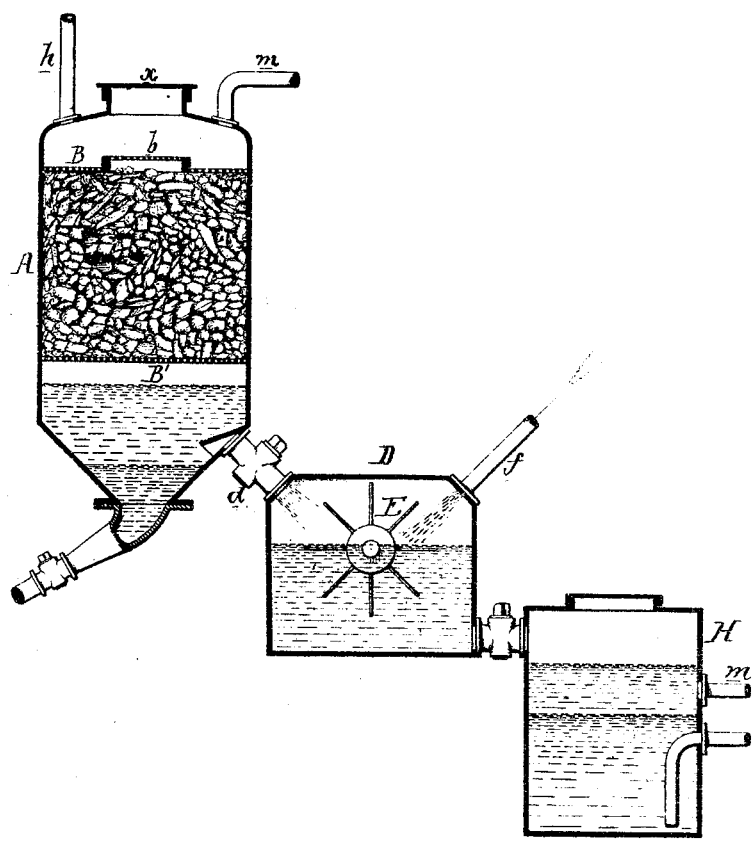

UNITED STATES PATENT OFFICE.

WILLIAM ADAMSON, OF PHILADELPHIA, PENNSYLVANIA.

IMPROVEMENT IN TREATING SUBSTANCES WITH LIQUID HYDROCARBON.

Specification forming part of Letters Patent No. 183,098, dated October 10, 1876; application filed August 17, 1876.

*To all whom it may concern:*

Be it known that I, WILLIAM ADAMSON, of Philadelphia, Pennsylvania, have invented an Improvement in Treating Substances with Liquid Hydrocarbon, of which the following is a specification:

My invention relates to an improvement in treating animal and vegetable substances by liquid hydrocarbons, for the purpose of extracting therefrom oils, fats, resin, &c., for cleansing different materials, and for preserving animal and vegetable substances.

The object of my improvement is to prevent the fetid and other odors imparted to the liquid hydrocarbon by the substances treated from being recommunicated to the said substances and to the extracts therefrom by the liquid hydrocarbon when reused.

The accompanying drawing is a sectional view of apparatus whereby my invention may be carried into effect.

A is a vessel, into which the substances to be treated are introduced through a man-hole, $x$, provided with a suitable detachable cover, and through an opening in the upper perforated diaphragm, B, a detachable perforated plate, $b$, being placed over the said opening after the substances have been passed through the same, the said substances being supported by the lower perforated diaphragm B', beneath which is a space for receiving the extract and liquid hydrocarbon after the latter has percolated through the mass in the vessel. The extract, which occupies the lowest position in the vessel, may be removed therefrom from time to time prior to being purified by distillation or otherwise. The liquid hydrocarbon is permitted to pass from time to time through a pipe, $d$, into a vessel, D, where it is met by jets of water from a pipe, $f$, the hydrocarbon and water being thoroughly agitated in the vessel by a revolving paddle-wheel, E. This washing of the liquid hydrocarbon may be accomplished by different appliances. For instance, the paddle-wheel may be dispensed with, and water forced upward into the vessel from below in the form of numerous small jets. The water and hydrocarbon after this washing operation are permitted to pass into the subsiding-vessel H, the hydrocarbon being above and the water below, the fetid and other odors divided by the hydrocarbon from the substances in the vessel A having, during the washing operation, been transferred to the water, which may be drawn off from time to time.

The washed and purified hydrocarbon may be pumped directly through a pipe, $m$, into the vessel A, to be reused for treating the substances therein; or it may be pumped, first, into a reservoir, and permitted to flow from the same into the said vessel A.

More or less hydrocarbon is wasted by being drawn off with the extract, and to make up for this loss a supply may be introduced at intervals from a tank through the pipe $h$.

By the practice of the process described above I am enabled to obtain a purer extract than by the ordinary process of treating substances with liquid hydrocarbon. At the same time the substances treated must be much more free from noxious odors than when the hydrocarbon is used over and over again without washing.

It is not essential to adhere to the apparatus illustrated and described in carrying out my invention. The construction of the apparatus will, in fact, depend in a great measure on the locality in which it has to be situated.

I claim as my invention—

As an improvement in treating animal or vegetable substances with hydrocarbon, for the purpose of extracting from such substances oils, fats, resins, &c., for cleansing different materials, and for preserving the substances, the within-described process, consisting of, first, causing the liquid to pass through the substances to be treated in one vessel, then causing the liquid to be washed in another vessel, separating the washed and purified hydrocarbon from the foul water, and, finally, returning it to be reused in the first vessel, all substantially as and for the purpose set forth.

In testimony whereof I have signed my name to this specification in the presence of two subscribing witnesses.

WILLIAM ADAMSON.

Witnesses:
HENRY HOWSON, Jr.,
HARRY SMITH.